United States Patent [19]

Morita

[11] Patent Number: 4,870,777
[45] Date of Patent: Oct. 3, 1989

[54] FISHING LINE DEVICE

[76] Inventor: Toshio Morita, 177 Donlands Avenue, Toronto, Canada, M4J 3P3

[21] Appl. No.: 136,605

[22] Filed: Dec. 22, 1987

[51] Int. Cl.$^4$ .................................................. A01K 91/00
[52] U.S. Cl. .................................. 43/42.74; 43/44.92; 43/44.93; 43/44.94
[58] Field of Search ................... 43/42.74, 44.84, 43.1, 43/44.87, 44.92, 44.93, 44.94

[56] References Cited

U.S. PATENT DOCUMENTS

| 983,310 | 2/1911 | Pflueger | 43/44.94 |
| 1,152,755 | 9/1915 | Perron | 43/44.94 |
| 1,512,656 | 10/1924 | Ward | |
| 1,603,293 | 10/1926 | Pflueger | 43/42.74 |
| 1,720,287 | 7/1929 | Moore | 43/42.74 |
| 2,260,059 | 10/1941 | Sears | 43/44.93 |
| 2,539,234 | 1/1951 | Dobkowski | 43/44.93 |
| 2,851,810 | 9/1958 | Vahrenwald | 43/44.94 |
| 3,514,891 | 6/1970 | Krull | 43/44.87 |
| 4,361,977 | 12/1982 | Lawler | 43/44.83 |

FOREIGN PATENT DOCUMENTS

| 629489 | 10/1961 | Canada | 43/42.74 |
| 1241871 | 8/1960 | France | 43/44.91 |

*Primary Examiner*—Gene P. Crosby
*Attorney, Agent, or Firm*—Moss, Hammond

[57] ABSTRACT

A hanger is disclosed for use with a fishing line to a lure and provides rigid arms, suspended from a float, through whose distal ends the line is threaded the combination. In this way, movement of one part of the device will serve to effect movement of the other parts of the combination depending on the geometry of the arms.

10 Claims, 3 Drawing Sheets

FISHING LINE DEVICE

BACKGROUND OF INVENTION

1. Field of Invention

This invention relates to a lure device which presents a plurality of movable fish-enticing objects.

2. Prio Art

Floats are known in the art, for example, U.S. Pat. No. 1,512,656 (Ward) and U.S. Pat. No. 3,514,891 (Krull). Such floats do not offer the advantages of the present invention.

SUMMARY OF INVENTION

According to the present invention, there is provided a hanger for use with a fishing line and lure, comprising: float means; an elongate member having two arms and being pivotably connected, at an intermediate portion thereof, to said float means, having two arms; where said first arm has means adapted for fastening a first portion of the fishing line, and said second arm has means adapted for fastening a second portion of the fishing line.

BRIEF DESCRIPTION OF THE DRAWINGS

As an illustrative example, a preferred embodiment of the invention is described in conjunction with the following drawings, in which.

DETAILED DESCRIPTION OF THE PREFERRED EMBODIMENTS

Figure 1:
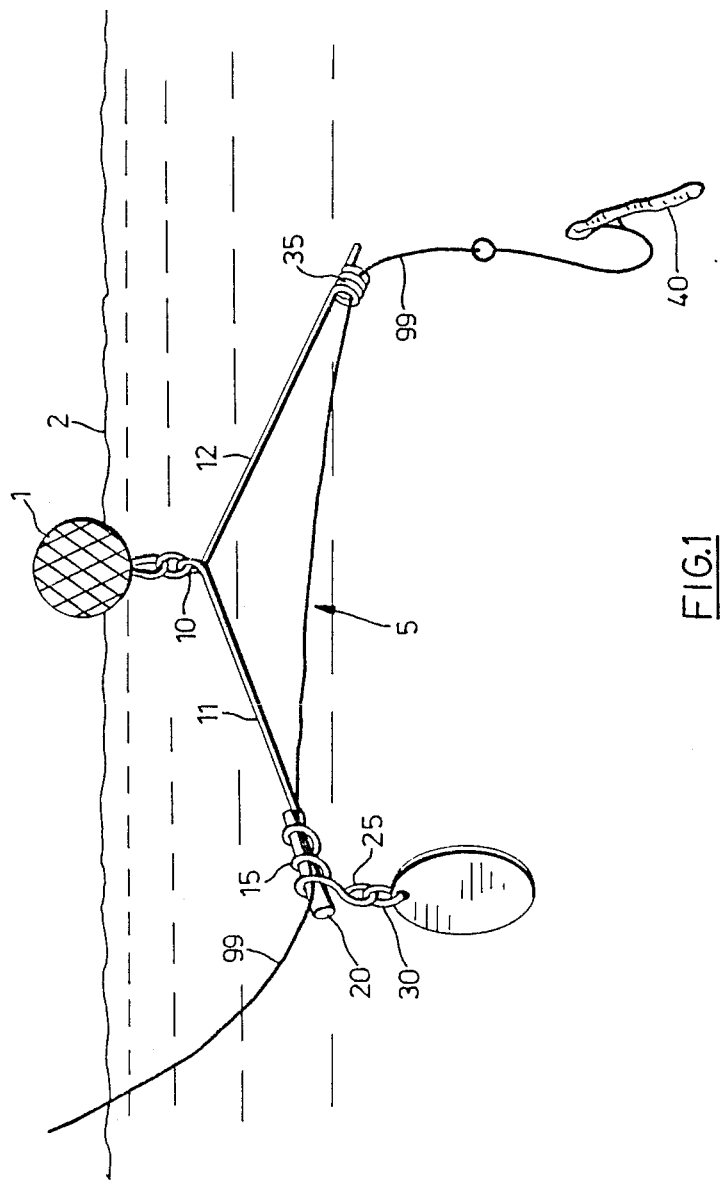
FIG. 1 is a front perspective view of the device of the invention.

Referring to FIG. 1, there is a float 1 floating on water surface 2. A rigid hanger, generally designated as 5, has a central eyelet 10 and two elongate arms 11 and 12, extending therefrom to form an obtuse angle therebetween. Float 1 is connected to eyelet 10 in any manner which permits free pivot of eyelet 10 and the remainder of hanger 5 with respect to float 1. In FIG. 1, the manner illustrated is a ring arrangement but it will be appreciated that a swivel arrangement or other conventional arrangements are possible.

Figure 2:
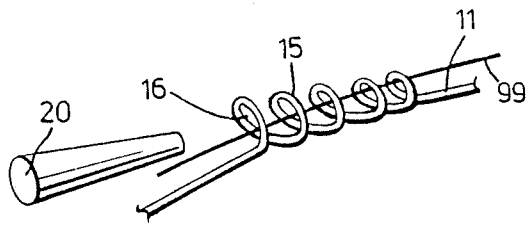
FIG. 2 is an expanded front perspective view of the wedge pin and spiral helix illustrated in FIG. 1.

As best seen in FIGS. 1 and 2, there is on arm 11 a spiral helix 15 with a complementary wedge pin 20. Spiral helix 15 has an axial aperture 16 therethrough and is defined by a continuum of individual coaxial helixes disposed in spaced longitudinal relationship. Spiral helix 15 continues into distal eyelet 25, to which a conventional metal spinner combination 30 is conventionally and pivotably fastened.

Fishing line 99 is manually guided into axial aperture 16 and through spiral helix 15. Fishing line 99 is secured against longitudinal movement with respect thereto by the insertion and wedging of wedge pin 20, which friction grips a portion of fishing line 99 between wedge pin 20 and spiral helix 15. Fishing line 99 continues past spiral helix 15, as described next.

Figure 3A:
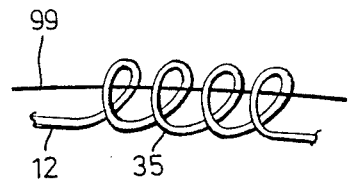
FIG. 3A is an expanded front perspective view of the distal helix illustrated in FIG. 1.

As best seen in FIGS. 1 and 3A, arm 12 has a distal helix 35, through which is guided fishing line 99 continued from spiral helix 15 of arm 11. Fishing line 99 continues to a sinker, hook, bait and other means for enticing fish, designated generally as 40.

In operation, hanger 5 performs like an underwater mobile, suspended from float 1 on water surface 2. Water currents act to spin and displace spinner 30 on arm 11, which spin and displacement is reciprocated by like action of bait 40 on arm 12, a pivot action being created about centrally eyelet 10. The use of live bait 40, such as a worm, will cause reciprocal action of spinner 30. Waves on water surface 2 will cause float 1 to bob and move therealong, thereby causing displacement and spinning of spinner 30 and bait 40. By the manual tugging of fishing line 99, similar action can be achieved. The result of any of the above actions is the presentation of two moving spaced apart targets, spinner 30 and bait 40, to better entice fish.

It has been found that float 1 may be suitably constructed with a styrofoam ball of two centimeters diameter, and enmeshed in fine fishnet; that arms 11 and 12 may be approximately three centimeters long and made of piano wire; and that pin 20 may be approximately one to three centimeters long and made of bamboo. However, the physical characteristics of wedge pin 20, float 1 and hanger 5,—their buoyancy, weight, and size—may be varied so long as, in operation, hanger 5 is pivotally suspended underwater by float 1, much like an ordinary hanger would hang from a rack.

Figure 3B:
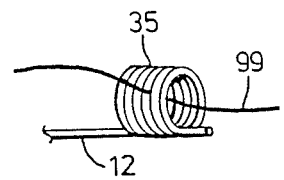
FIG. 3B is an expanded front perspective view of a second embodiment of the distal helix.

In a second embodiment of distal helix 35, best seen in FIG. 3B, the separation between adjacent helixes is narrowed so that fishing line 99 may be manually wedged therebetween. In this embodiment, a sinker further down fishing line 99 may not be necessary, as the tension of that portion of fishing line 99 between distal helix 35 and spiral helix 15 is maintained by the wedging at said helixes. Not shown is a variation of distal helix 35 where the separation between adjacent helixes progressively narrow narrows in the distal direction, culminating in one pair of adjacent helixes having a sufficiently narrow separation to wedge a portion of fishing line 99. This would permit easy manual guidance of the fishing line 99 into a wedged position.

Figure 4:
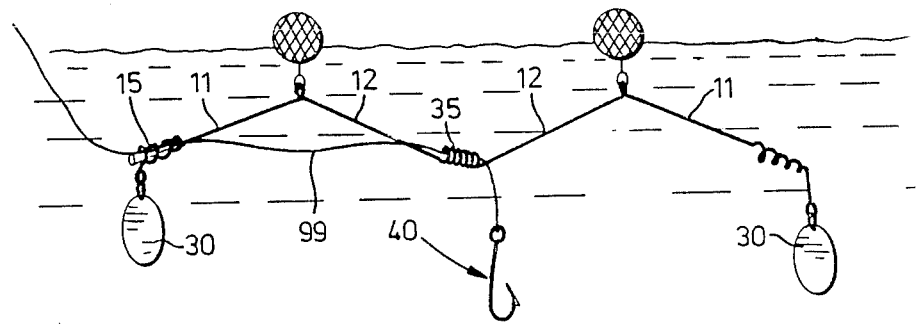
FIG. 4 is a front perspective view of an alternative preferred embodiment of the invention.
Figure 5:
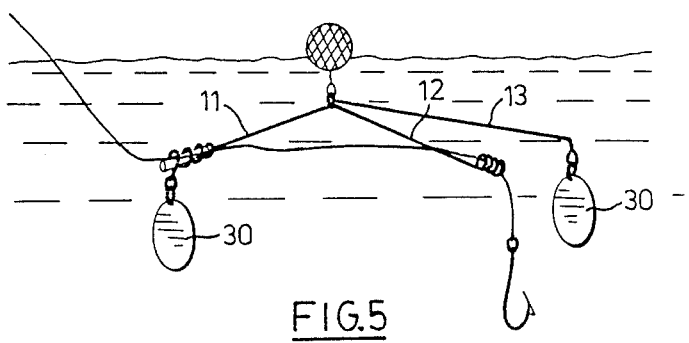
FIG. 5 is a front perspective view of an alternative preferred embodiment of the device of the invention having three arms.

An alternative embodiment as illustrated in FIG. 4, is an assembly of two hangers according to the present invention, rotatably connected by interconnection of their respective distal helixes 35. In this configuration two reciprocating spinners 30 are provided for enticing fish. In another alternative, as illustrated in FIG. 5, there is an additional arm 13 rigidly attached to central eyelet 10, with associated spinner 30. In this way, three moving enticing objects are presented.

It will be appreciated that varying the relative lengths of arms 11, 12 and 13 will vary the reciprocating relationship between spinners 30 and bait 40. In other words, eyelet 10 need not be precisely centrally positioned.

It will also be appreciated that arms 11, 12 and 13, identified as an "elongate arm" for simplicity, may in fact be elongated, arcuate, spiral, irregular or take on some other suitable geometry. Accordingly, the reciprocating relationship between spinners 30 and bait 40 may be varied advantageously for specialized circumstances.

Figure 6:
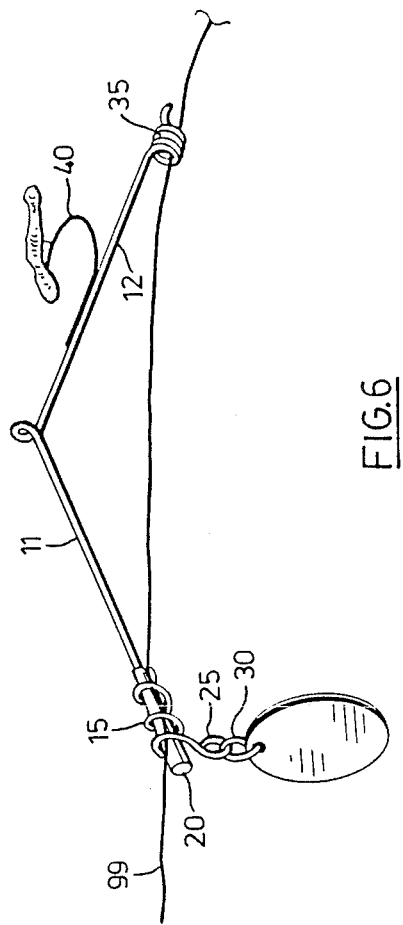
FIG. 6 is a front perspective view of an alternative preferred embodiment of the device.

In FIG. 6, a variation is illustrated similar to the embodiment illustrated in FIG. 1. There is live bait on a hook at 40 which is rigidly attached to arm 12 by conventional means. Line 99 runs through distal helix 35, and may terminate there by attachment thereto, or continue to carry additional hooked bait (not shown). The main difference between this variation and that illustrated in FIG. 1 is the absence of float 1. In this way, underwater fishing is facilitated.

It will be appreciated that spiral helix 15 may be, for simplicity, replaced with other conventional line fastening means, such as an elastic band or simple manual knotting; and that distal helix 35 need not be fastening means but may simply be means through which fishing line 99 is slidably guided.

It will be apparent to those skilled in the art that the preceding descriptions of various embodiments may be substantially varied to meet specialized requirements without departing from the spirit and scope of the invention disclosed.

The embodiments of the invention in which an exclusive property or privilege is claimed are defined as follows:

1. A hanger for use with a continuous fishing line and lure, comprising:
    (a) float means;
    (b) an elongate member having two arms and being pivotably connected, at an intermediate portion thereof, to said float means;
    wherein said first arm has means adapted for fastening a first portion of the fishing line, and said second arm has means adapted for fastening a second portion of the continuous fishing line.

2. A hanger according to claim 1, wherein said second arm fastening means includes a helical member defining an axial aperture therethrough and a complementary pin adapted to be releasably wedgeable in said aperture for retaining said second portion of the fishing line against longitudinal movement therethrough.

3. A hanger according to claim 1, wherein said second arm fastening means includes a helical member defining an axial therethrough, said helical member comprising a continuum of spaced apart adjacent coaxial helixes disposed in longitudinal extended relation and the separation one pair of adjacent coaxial helixes is sufficiently small to releasably wedge the fishing line therebetween.

4. A hanger for use with a continuous fishing line and lure, comprising:
    (a) float means;
    (b) an elongate member having two arms and being pivotably connected, at an intermediate portion thereof, to said float means;
    wherein said first arm has means adapted for fastening a first portion of the fishing line, and said second arm has means adapted for guiding a second portion of the continuous fishing line.

5. A hanger according to claims 1 or 4, wherein said first arm fastening means includes a first helical member defining an axial aperture therethrough and a complementary pin adapted to be releasably wedgeable in said aperture for retaining said first portion of the fishing line against longitudinal movement therethrough.

6. A hanger according to claims 1 or 4, wherein said first arm fastening means includes a first helical member defining a spiral axial aperture therethrough and a complementary pin adapted to be releasably wedgeable in said aperture for retaining said first portion of the fishing line against longitudinal movement therethrough.

7. A hanger according to claim 4, wherein said second arm guiding means includes a second helical member defining an axial aperture therethrough.

8. A hanger for a continuous fishing line and lure, comprising:
    (a) an elongate member with a first arm and a second arm, wherein said first arm has fastening means adapted for fastening securely a first portion of the fishing line to said first arm so as to lock said first portion against movement, and said second arm has guide means adapted for guiding a second continuous portion of said fishing line leading to said lure; and
    (b) first fish enticing means connected to said first arm.

9. A hanger according to claim 8, wherein said fastening means comprises a helical member defining an axial aperture therethrough and a complementary pin releasably wedgeable in said aperture for retaining said fishing line against longitudinal movement therethrough.

10. A hanger according to claim 8 or 9, further comprising second fish enticing means connected to said second arm.

* * * * *